United States Patent Office 2,766,449
Patented Oct. 9, 1956

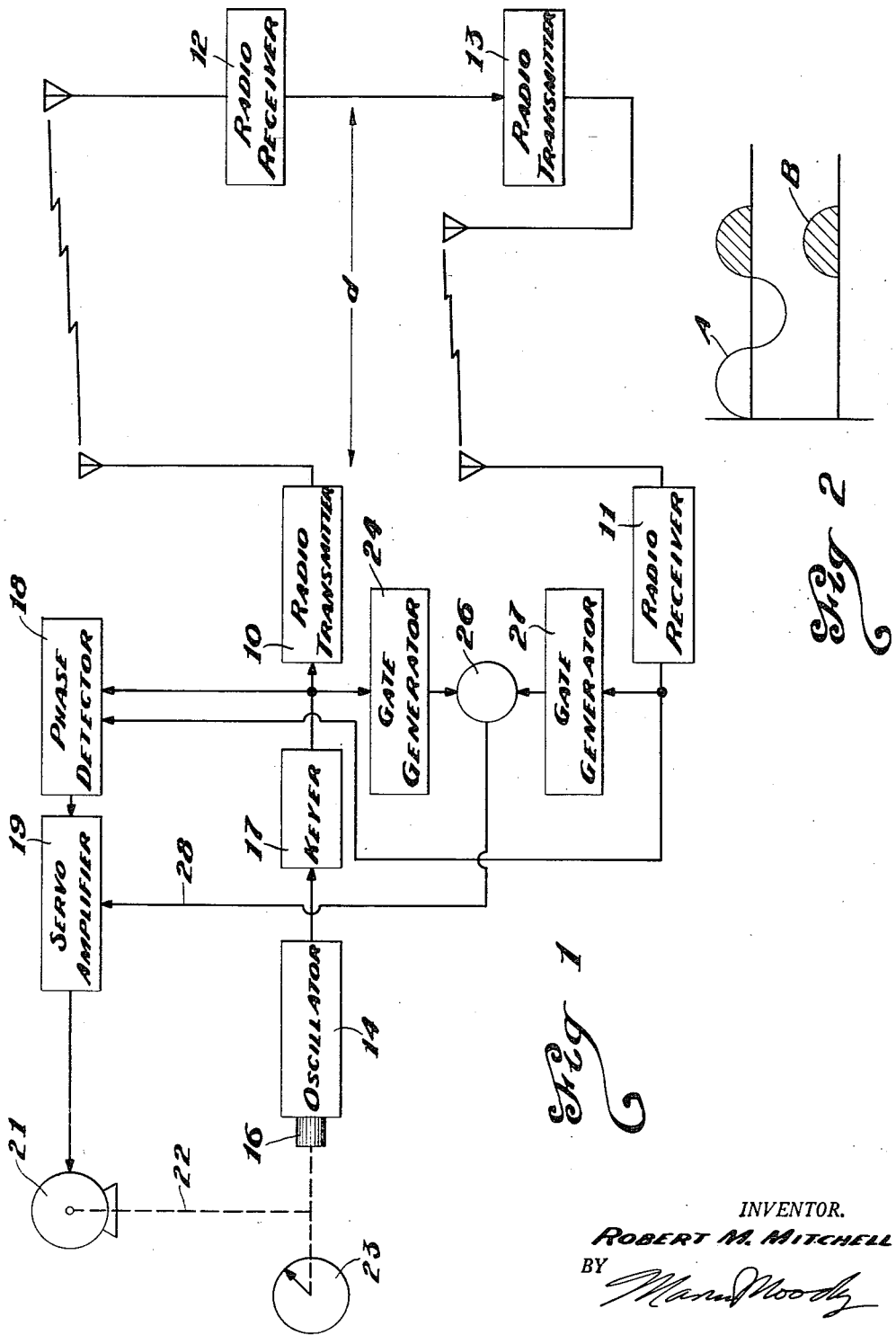

2,766,449

DISTANCE MEASURING SYSTEM

Robert M. Mitchell, Cedar Rapids, Iowa, assignor to Collins Radio Company, Cedar Rapids, Iowa, a corporation of Iowa Application December 20, 1951, Serial No. 262,533

2 Claims. (Cl. 343—7.5)

This invention relates in general to distance measuring devices and in particular to apparatus which measures distance by varying frequency.

It is oftentimes desirable to measure the distance between two points. For example, in aircraft navigation, a plane can obtain a bearing or line of position with a radio compass. However, to obtain a fix, the distance from the transmitter and the transmitters position must be known. This requires distance measuring equipment.

It is an object of this invention therefore to provide distance measuring apparatus wherein frequency varies inversely as the distance.

Another object of this invention is to provide an improved distance measuring circuit that has great accuracy of high magnitude.

A feature of this invention is found in the provision for a first transmitter and receiver located at one point and a second receiver and transmitter located at a remote point and with the modulation frequency of the one of the transmitters variable so that the time required for loop travel will be equivalent to one cycle of modulation.

Further features, objects and advantages of this invention will become apparent from the following description and claims when read in view of the drawings in which:

Figure 1 illustrates schematically the distance measuring equipment of this invention; and, Figure 2 illustrates the time relationship of the transmitted and received waves.

Figure 1 illustrates a first radio transmitter 10 which is located at a first position that might be fixed. A receiver 11 is located at the same position.

A second radio receiver 12 is located at a remote position which might be constantly moving, for example. A second transmitter 13 is located at the remote position. The transmitters and receivers are connected respectively, to suitable antennae.

The radio transmitter 10 has a carrier frequency which might be, for example, fifty megacycles. The radio receiver 12 is tuned to this same carrier frequency so that it receives energy from transmitter 10.

The transmitter 13 has a carrier frequency different from that of transmitter 10 which might be, for example, sixty megacycles. The receiver 11 is tuned to the carrier frequency of transmitter 13. The distance "d" between the two positions is desired.

An oscillator 14 is located at the first position and may be varied in frequency by the control shaft 16. The oscillator produces an output which is fed to a keyer 17. The keyer 17 periodically passes the output of oscillator 14 so that it modulates the output of transmitter 10.

The radio receiver 12 receives the modulated carrier from transmitter 10 and removes the modulation and supplies it to the transmitter 13. The modulation frequency modulates the carrier frequency of transmitter 13 and is radiated.

Receiver 11 receives the energy from transmitter 13 and detects the modulation. The output of receiver 11 has the same frequency as the output of oscillator 14 but is displaced in phase due to the time required to travel the distance "d" twice and pass through the various electrical circuits.

It is an object of this invention to obtain coincidence between the output of oscillator 14 and the output of receiver 11 but with 360 degrees phase difference between them. When this occurs the distance "d" may be calculated because the velocity of radio waves through air is well known to those skilled in the art. The delays through the various electrical circuits may be measured.

A phase detector 18 receives an input from the keyer 17 and a second input from the receiver 11 to compare the phases and produce a direct current output proportional to the phase difference. A servo amplifier 19 receives the output of phase detector 18. A servomotor 21 receives the output of amplifier 19 and has its output shaft 22 connected to the control shaft 16 of the oscillator 14. A meter 23 is driven by shaft 22 and is calibrated to read the distance "d."

Means are provided so as to assure that there is no ambiguity and that the output of receiver 11 is in phase with the second cycle of the oscillator 14 rather than the third or some other cycle. This comprises a first gate generator 24 that receives an input from the keyer 17 and produces a pedestal that lasts for 540 degrees of the timing wave cycle. It is to be understood that the keyer 17 only periodically passes the output of the oscillator 14 to the transmitter 10 and turns the output off after a few cycles have passed.

A coincidence tube 26 receives the gate from gate generator 24 and a second input from a second gate generator 27 which receives an input from receiver 11. The gate generator 27 produces a pedestal or gate corresponding to 180 degrees of the timing wave cycle each time an input is received from receiver 11. When coincidence occurs, the coincidence tube 26 supplies an electrical biasing signal through a lead 28 to servo amplifier 19 to allow it to pass the output of the phase detector 18.

Figure 2 illustrates the 540 degree wave A passed by gate generator 24 and the 180 degree wave B passed by gate generator 27. When the shaded areas of curves "A" and "B" are not in phase, phase detector 13 will produce an output that will be amplified and cause the motor 21 to vary the oscillator 14 until coincidence does occur.

The parameters that might be used in the equipment for measuring distances between one and one hundred miles are 93,200 cycles per second at one mile range and 932 cycles per second at 100 miles. The keying rate could be varied over wide limits depending on the speed at which distance data is required. At maximum range, where the timing wave frequency has a minimum value, the on period of the "interrogation pulse" should probably be of the order of 10 milliseconds. If desirable, this on period could be decreased as a function of timing wave frequency to always include some fixed number of cycles determined by the requirements of the phase detector and memory circuits following it. In a practical system both keying rate and interrogation pulse width will be determined as a compromise between performance and the number of equipments required to time share on one radio carrier channel and common terminal facility. It will be noted that timing wave frequency increases rapidly near minimum range. Therefore some consideration should be given to restricting the minimum range and hence the required bandwidth. A factor of two in bandwidth may be gained by restricting the timing wave frequency to a value of one-half that required for one co plete cycle of phase delay and using phase detector error voltage as a measure of distance during this interval. Special attention should be given to the radio transmitting and receiving equipment used in this system to insure that the phase vs. frequency curve be stable, have a minimum slope and be linear in order that this delay can be compensated for during initial calibration of the instrument.

A unique feature of this system is the fact that it supplies information for distance measurement at both terminals of the link. At terminal A, the distance information is obtained directly from the mechanical motion of the timing oscillator frequency control element. In normal operation this frequency is automatically adjusted to a value to satisfy the distance separating the two terminals. If desired, a frequency meter, calibrated in units of distance may be used to provide a distance indication at terminal B.

It will also be recognized that either or both terminals of this system may readily be made either fixed or mobile.

Although this invention has been described with respect to a particular embodiment thereof, it is not to be so limited as changes and modifications may be made therein which are within the full intended scope of the invention as defined by the appended claims.

I claim:

1. Distance measuring apparatus wherein frequency is inversely proportional to distance comprising, a first transmitter and a first receiver located at a first position, a second receiver and a second transmitter located at a second position, the second receiver tuned to the output of the first transmitter, the second transmitter receiving the output of the second receiver to retransmit the modulation of said first transmitter, the first receiver tuned to the output of the second transmitter, a local oscillator at the first position, a keyer connected to said local oscillator and periodically passing its output to modulate said first transmitter, a first gate generator connected to said keyer and producing a pedestal approximately equal to 540 degrees of the local oscillator's output, a second gate generator receiving an output from the first receiver and producing a pedestal approximately equal to 180 degrees of the local oscillator's frequency, a phase detector receiving inputs from the keyer and the first receiver, a servo amplifier receiving the output of said phase detector, a coincidence tube receiving the outputs of the first and second gate generators, said servo amplifier receiving the output of said coincidence tube to pass the phase detector output when coincidence occurs, a servomotor receiving the output of said servo amplifier, and said servomotor connected to said variable frequency oscillator to vary its frequency until the output of the phase detector is zero.

2. Distance measuring apparatus for measuring distances between stations by varying a modulating frequency to obtain a distinct number of wave lengths between the transmitted and received waves comprising, a first transmitter and receiver located at a first position, a second transmitter and receiver located at a second position, the second receiver tuned to the output of the first transmitter, the first receiver tuned to the output of the second transmitter, the output of the second receiver supplied to modulate the output of the second transmitter, a variable frequency oscillator at the first position, a keyer receiving the output of said oscillator and periodically passing it, the first transmitter receiving the output of said keyer to modulate its carrier frequency, a first gate generator receiving an output from said keyer to produce a pedestal substantially equal to 540 degrees of the oscillator's output, a second gate generator receiving the output of the first receiver to produce a pedestal substantially equal to 180 degrees of the oscillator's output, a coincidence tube receiving the outputs of the first and second gate generators, a phase detector receiving inputs from said keyer and said first receiver, a servo amplifier receiving the output of said phase detector, said servo amplifier receiving an input from said coincidence tube to pass the phase detector output when coincidence occurs, frequency varying means connected to said oscillator, a servomotor connected to said frequency varying means and receiving the output of said servo amplifier, and indicating means connected to the output shaft of said servomotor.

References Cited in the file of this patent

UNITED STATES PATENTS

| | | |
|---|---|---|
| 2,147,810 | Alford | Feb. 21, 1939 |
| 2,385,641 | Peterson | Sept. 25, 1945 |
| 2,520,489 | Bergmar et al. | Aug. 29, 1950 |
| 2,529,510 | Manley | Nov. 14, 1950 |
| 2,546,973 | Chatterjea | Apr. 3, 1951 |
| 2,580,560 | Larsen | Jan. 1, 1952 |